UNITED STATES PATENT OFFICE.

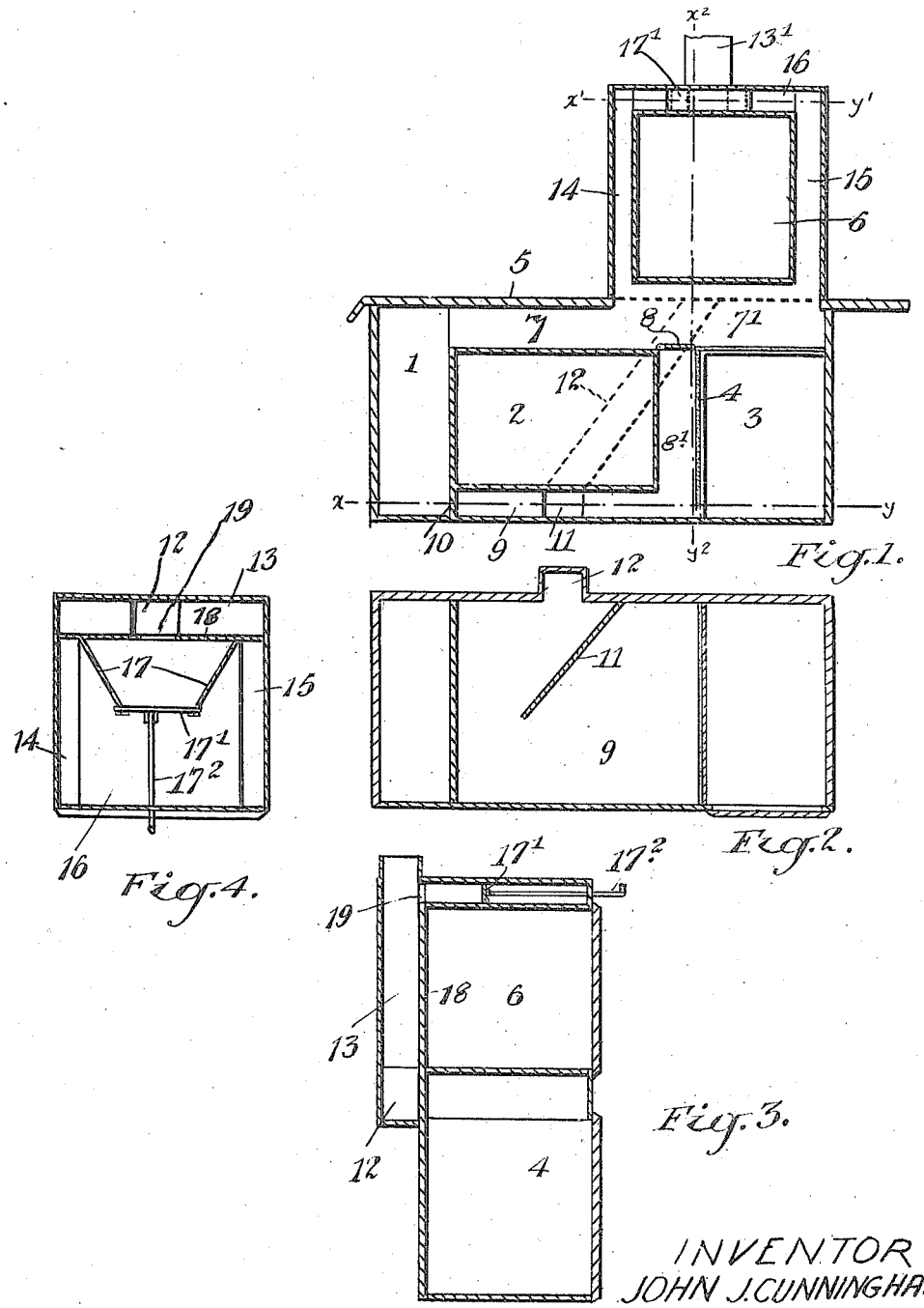

JOHN JOSEPH CUNNINGHAM, OF WINGHAM, ONTARIO, CANADA.

COAL-RANGE.

1,263,864.  Specification of Letters Patent.  Patented Apr. 23, 1918.

Application filed September 15, 1917. Serial No. 191,642.

*To all whom it may concern:*

Be it known that I, JOHN JOSEPH CUNNINGHAM, of the town of Wingham, in the county of Huron, in the Province of Ontario, Canada, have invented certain new and useful Improvements in Coal-Ranges, of which the following is the specification.

My invention relates to improvements in coal ranges and the object of the invention is to devise a range in which the ovens may be so arranged as to perform the essential parts of ordinary cooking independently and thereby effect a maximum economy in fuel.

My invention consists of a range having a fire box and ash pit at one side or end of the range, a meat oven in proximity thereto, a rising oven at the opposite end to the fire box, a baking or pastry oven located above the rising oven, the products of combustion and flues, which carry them, being arranged around the ovens as hereinafter more particularly explained.

Figure 1, is a longitudinal section through a stove constructed in accordance with my invention.

Fig. 2, is a sectional plan on line $x$—$y$ Fig. 1.

Fig. 3, is a vertical cross section on line $x^2$—$y^2$ Fig. 1.

Fig. 4, is a plan on line $x'$—$y'$ Fig. 1.

In the drawings like letters of reference indicate corresponding parts in the various figures.

1 indicates the ordinary fire box and ash pit section, which is provided with the usual fire pot at the top and ash pit at the bottom. 2 indicates the meat cooking oven. 3 indicates the rising oven, which is provided with an outer covering of asbestos or other suitable heat non-conducting material 4. 5 indicates the top shelf or table of the stove. 6 indicates the baking or pastry oven. All these ovens are provided with the usual doors.

The oven 2 has a flue 7 at the top and a damper 8 at one end of the flue. A flue or space 9 is located beneath the oven and this is separated from the ash pit by a partition 10. A baffle plate 11 is located beneath the oven as indicated in Figs. 1 and 2, being set diagonally extending from the back of the range.

A flue 12 extends diagonally from one side of the baffle plate to the back of the oven 6 into a space 13. The oven 6 has side spaces 14 and 15, top space 16 and bottom space 7', which is a continuation of the flue space 7 and above the oven 2. At the top of the oven 6 are arranged baffle plates 17, which are connected by a hinged damper 17' operated by a rod 17². 18 indicates the back wall of the oven 6, which is provided with a central opening 19.

Having described the principal parts involved in my invention I will briefly describe the operation of same.

If it is desired to use the meat oven the damper 8 is thrown back and the products of combustion pass along the flue 7, down the space 8' between the ovens 2 and 3 into the space 9, thence around the baffle plate 11 and through the flue 12 and space 13 out by the smoke flue 13'. During this course of the products of combustion it will be seen that the heat thereof passing through the passageway 8' will radiate to a certain extent into the rising oven 3 in which bread may be set.

Should it now be desired to use the baking oven 6 the damper 8 will be thrown into the position shown in the drawings, that is, closed. The products of combustion will then no longer pass around the oven 2 but will find their way through the passageway or flue 7' and spaces 14 and 15 on each side of the oven 6 and up over the oven around the baffle plate 17 and over the damper 17', which will now be opened, through the opening 19 into the space 13 and out through the smoke flue 13'.

It will be noticed that even in this case the heat from the products of combustion will impinge upon the top of the oven 3, which will, therefore, still be heated to a more or less extent and this too no matter whether the oven 2 or oven 6 be used.

From the construction I have described it will be readily seen that I utilize very efficiently the products of combustion to a maximum extent so that practically no heat is wasted but all calorific value is advantageously taken advantage of.

What I claim as my invention is.

The combination with a stove casing, of a fire box located at one end, an oven located in proximity to the fire box and having passageways above and below and at the side opposite to that on which the fire box is situated, an oven located adjacent this passageway opposite the fire box, an upper oven having a passageway or flue separating it from the lower ovens and side flues or passageways and a top passageway, a damper located at the top of the passageway between the lower ovens, a diagonally disposed baffle plate beneath the oven next to the fire box, a flue extending from the back of this oven upwardly, a flue chamber or space located above the top oven and with which the aforesaid flue communicates and a smoke flue leading from such space, baffle plates located in the space above the top oven, a damper connecting the aforesaid baffle plates and designed, when thrown open, to open the passageway through the opening of the back wall above the upper oven into the chamber behind the upper oven and the flue with which it connects.

JOHN JOSEPH CUNNINGHAM.

Witnesses:
 MINNIE BARBER,
 B. VAN STONE.

Copies of this patent may be obtained for five cents each, by addressing the "Commissioner of Patents, Washington, D. C."